2,753,883
Patented July 10, 1956

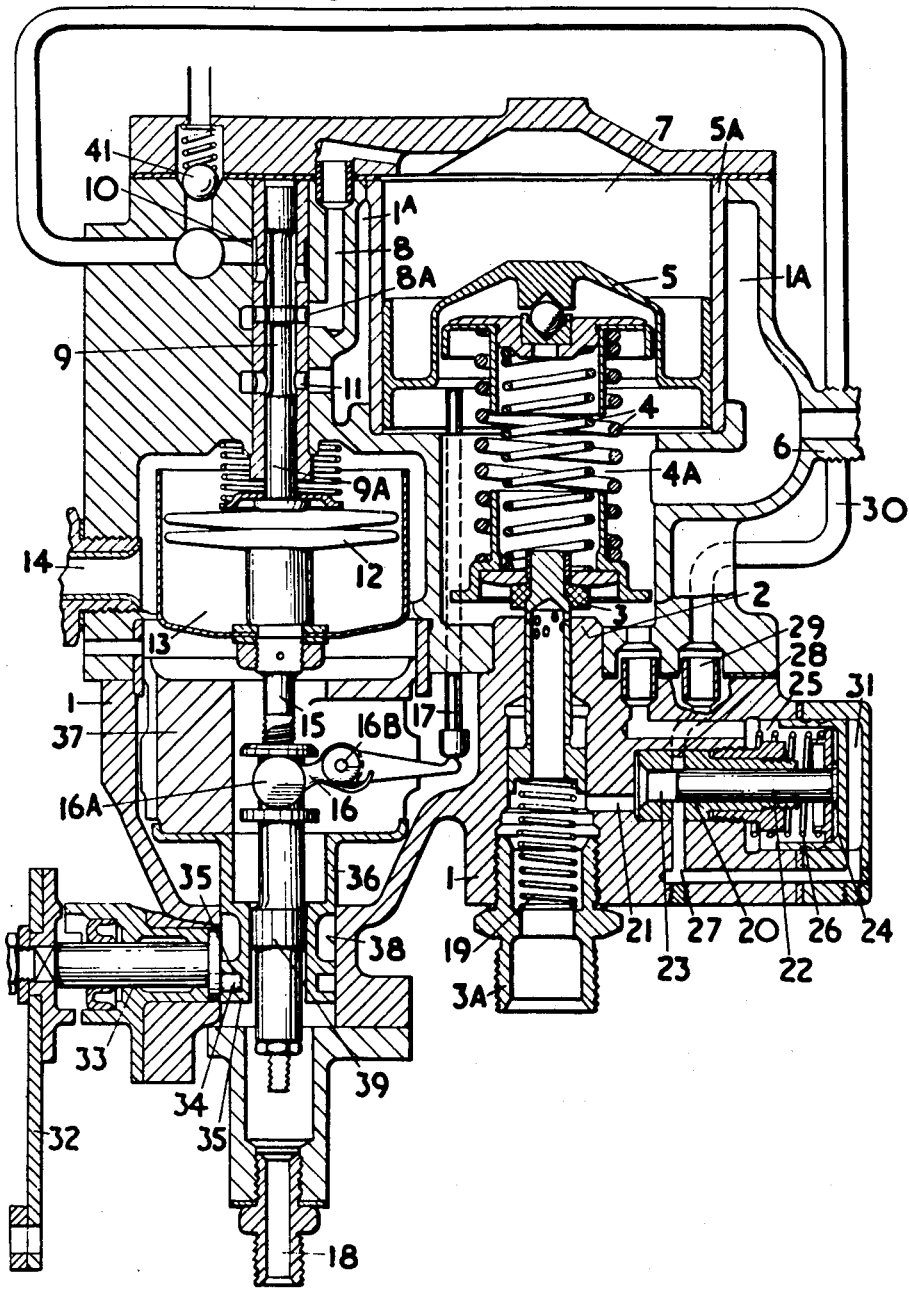

UNITED STATES PATENT OFFICE 2,753,883

CONTROL DEVICE

Geoffrey Bertram Robert Feilden, Lincoln, Archie Simons, Cove, near Farnborough, and Raymond Holl, Countesthorpe, Leicester, England, assignors to Power Jets (Research and Development) Limited, London, England, a British company Original application June 6, 1945, Serial No. 597,810, now Patent No. 2,669,245, dated February 16, 1954. Divided and this application March 5, 1952, Serial No. 274,954

Claims priority, application Great Britain June 8, 1944

2 Claims. (Cl. 137—81)

The invention relates to a control device and in particular to improvements in a control device described in United States patent application Serial No. 597,810, now Patent 2,669,245. This application is a division of said application Serial No. 597,810 which is now Patent 2,669,245.

The invention described in United States patent mentioned above consists broadly in a device comprising a resiliently loaded relief valve controlling the pressure of first fluid (i. e. that fluid which is to be controlled), the resilient load of which valve is variable by variation of the effective fluid pressure of a third fluid and means controlled by variations of pressure of a second fluid to vary the resilient loading on the relief valve by varying the effective pressure of the third fluid; and when the control device is used to control an airplane engine, the first fluid is the actual liquid fuel being supplied to the engine, the second fluid is the atmosphere, the pressure of which either by itself or as affected by pitot head due to forward speed, is regarded as the ambient pressure and acts upon the device. The third fluid is conveniently a servo fluid, for example, lubricating oil or some of the engine fuel pressure controlled so as to be usable as a servo fluid.

According to the present invention a valve device for controlling a first fluid in accordance with variations in the pressure of a second fluid, comprises a resiliently loaded relief valve for adjusting the pressure of said first fluid, a pressure fluid operating device having a cylinder with a piston therein directly engaging said resilient load of said relief valve for adjusting the loading to any desired value over a range of values and a fluid pressure system having control means by which the effective pressure is controlled actuated by pressure sensitive means in accordance with variations in the pressure of said second fluid for operating said adjusting piston, and manual lever means also actuating said control means for operating said adjusting piston through said pressure sensitive means and independently of the actuation thereby. The valve device may comprise a relief valve with resilient loading means for loading it towards its closed position, servo system means including a cylinder with a power piston directly engaging said resilient means for loading it, servo valve means for controlling the loading of said power piston to any desired value over a range of values, a follow-up device mechanically linking said piston and servo valve means, a pressure sensitive means in said linkage sensitive to variations in the pressure of said second fluid for varying said servo valve means and manual means for acting on said linkage for varying said servo valve means to vary the resilient loading on said relief valve acting through said pressure sensitive means and independently of the actuation thereby. Preferably the pressure sensitive means is moved bodily by the follow-up linkage and the manual lever means.

The present invention is particularly intended for use with "spill controlled" burners of the type having a hollow cylindrical swirl chamber to which high pressure fuel is supplied tangentially to swirl therein and issue axially either through a fuel spray nozzle orifice arranged at one end or through a spill return pipe arranged at the other end or through both, and in which the rate of fuel issuing from the fuel spray orifice depends on restriction imposed in spill return pipe, complete restriction causing full fuel flow from the spray orifice, no restriction causing no flow from the spray orifice and full return through the spill pipe, and partial restriction causing some fuel to issue from the spray orifice and the remainder to return through the spill pipe.

As the control of the fuel issuing from the fuel nozzle of the "spill controlled" burners depends on the degree of restriction imposed in the fuel return pipe, a manual control can be incorporated in the control device in a very simple manner. The servo valve of the control device which is positioned by the pressure sensitive capsule in accordance with ambient atmosphere is also moved by hand through a lever system moving the pressure sensitive capsule bodily so that the resilient loading of the relief valve is varied in accordance with both manual and barometric control.

The invention will now be described by way of example with reference to the accompanying drawing which is a sectional view through the control device.

The control valve device comprises a casing or body 1 having a relief-valve seat 2, and relief valve 3 which is on a stem and spring-urged towards the seat by a pack of springs 4 selected to give the required rate. The spring pack 4 is housed in a cylindrical chamber 4A and reacts on the underside of a servo piston 5 sliding in a cylinder 5A. To the underside of the valve 3 is supplied the fuel entering the body 1 under pressure by the union 3A at the full pressure of the fuel pump. Fuel rising and passing the valve 3 is collected in the spring chamber 4A and escapes through a union 6 to return to the fuel source e. g., a tank. The load of the spring pack 4 on the valve 3 is determined by the position of the piston 5. Servo fluid pressure acts above this piston in the space 7, which communicates by a duct 8 with a slide valve port 8A controlled by a slide servo valve 9 which either admits servo fluid (which is supplied through the port 10 to the space 7 or emits it from the space through the port 11). The valve 9 is preferably so dimensioned in relation to its port that when the valve is balanced it allows a very small flow from port 10 to port 8a, maintaining the servo pressure in space 1A.

The valve 9 is moved through a stem 9A by the deformations of a flexible barometric capsule 12 which is evacuated and acts as a pressure sensitive device. The ambient pressure communicates with the interior of a chamber 13 through a vent 14 which is suitably protected to prevent ingress of foreign matter. The capsule 12 housed in the chamber 13, is mounted at its lower end on a guided rod 15 guided by an adjustably secured guide member 39, one end of which is slidable within a sleeve 16A of a rocker 16. A fulcrum 16B is provided for the rocker 16, the tail of which rocker is acted upon by a pushrod 17 slidable in structure of the body 1, the upper end of the pushrod 17 abutting against the underside of the piston 5. This pushrod and rocker mechanism acts as a follow-up device, because the position of the piston 5 determines the location of the capsule 12 within its chamber 13, thus when an expansion of the capsule 12 causes the valve 9 to rise, emitting servo-fluid from the space 7, the piston 5 rises (by influence of the spring pack 4) thereby reducing the fuel pressure required to open the valve 3, and simultaneously the pushrod 17 rises, dropping the whole of the capsule 12. This train of action corresponds with a fall in ambient pressure in 13, i. e., with an increase of altitude (or decrease of forward speed in a case where Pitot pressure is a factor). Its result in the fuel system is to reduce the supply pressure for a given set of conditions, thus to reduce the fuel supply to the engine. The body 1 is formed with jacket spaces as at 1A in which relieved fuel circulates to maintain the temperature of the working parts, especially the cylinder 5A.

A drain connection at 18 may be provided for any leakage of servo fluid, or condensate, which might otherwise accumulate in the chamber 13.

The relief valve 3 is held open by a spring 19, thus giving no spill pressure which is the best condition when igniting the burners on starting the engine. As the speed of the engine increases, the spill pressure (and hence the servo fluid pressure) ceases to be negligible. The main piston 5 then moves slowly down, gradually loading the relief valve 3 until the follow up mechanism acting as described above moves the servo valve 9 to the neutral position. This is then the preset idling condition, speed adjustment being obtained by moving the fulcrum 16B as will be hereinunder described.

A reducing valve 20 comprises a piston 22 movable in a bore 23 and held in contact with a piston head 24 by a spring 26. The piston head 24 is slidable in a cylindrical chamber 25 under the influence of the spring 26 which tends to cause the piston 22 to open the passages 27, 28. Fuel acting as servo fluid enters the valve 20 through the passage 21, and in the position shown part of said fluid enters the passage 27 and the remainder flows into the passage 28, thence into the chamber 29 and through the pipe 30 to the passage 10 which serves for the admission of servo fluid to slide valve 9 and thence through the passage 8 to the chamber 7.

The spring 26 is set so that if the pressure of the servo-fluid exceeds a pre-selected value, that part of the fuel which enters the passage 27 also flows into space 31 and acting on the piston head 24 overcomes spring 26 to cause the piston 22 to close the passages 27, 28, thus reducing the pressure of the servo fluid fuel.

As the control of fuel issuing from the fuel nozzle of the "spill controlled" burners depends on the degree of restriction imposed in the fuel return line from the burners any additional control other than that imposed by the pressure sensitive capsule can be obtained by modification of the loading of the relief valve 3. The servo valve 9 which is positioned by the pressure sensitive capsule 12 in accordance with ambient atmosphere is moved by hand through a lever system as well thereby modifying the pressure of the fluid acting on the piston 5 loading the relief valve 30. The device can therefore act as a manual and automatic fuel control device on the spill side of the spill controlled burners.

For this purpose a control lever 32 rigidly connected to spindle 33 carries an eccentrically mounted pin 34 arranged between two flanges 35 of a sleeve 36 formed in one with a movable block 37, which is slidable within the neck 38 of casing 1. The rocker arm 16 is carried by a fulcrum 16B fixed in the block 37 so that movement of the sleeve 36 by the lever 32 displaces the fulcrum 16B and consequently the fork 16A moves the guide rod 15 capsule 12 and valve 9.

To reduce engine speed it is necessary to increase the spill from the burners so that their output is reduced. This is done by moving lever 32 so as to move pin 34 upwards, which consequently moves fulcrum 16B upwards also and raises valve 9 allowing servo fluid to pass from the space 7 and reducing the load on the piston 5, thus permitting valve 3 to move upwards thereby decreasing the spill pressure and causing a greater quantity of fuel to be spilled.

The follow-up mechanism associated with rocker 16 and servo-valve 9 then operates as described above and the valve 9 moves to the neutral position for the new fuel flow. To increase engine speed the lever 32 is moved to allow the valve 9 to pass servo fluid through the port 8A and passage 8 to the space 7 to load the piston 5 and load the valve 3.

A relief valve 41 is provided to allow for the case when valve 20 fails and no fuel is being used.

We claim:

1. A valve device for controlling the pressure of a first fluid in accordance with variations in the pressure of a second fluid comprising a resiliently loaded relief valve for adjusting the pressure of said first fluid, a pressure fluid servo system including a piston sliding in a cylinder for loading said resilient loading of said relief valve, a piston type servo valve with stem arranged for sliding movement in the same direction as said piston for controlling the flow of pressure fluid to and from said cylinder to move said piston to vary the loading of said resilient loading on said relief valve to any desired value over a range of values, a push rod, one end of which engages said piston, arranged for sliding movement in the same direction as said piston and a rocker engaging the end of said stem and the other end of said rod, said rocker being arranged to pivot at a point between said stem and said rod to complete a follow-up mechanism, a pressure sensitive capsule sensitive to variations in the pressure of said second fluid positioned adjacent said valve on said stem to vary the setting thereof, manually operated lever means associated with said stem also to vary the setting of said valve to vary the resilient loading on said relief valve independently of the setting set by said capsule, and resilient means, acting in opposition to the resilient loading and holding said relief valve open when there is no resilient load thereon.

2. A valve device for controlling the pressure of a first fluid in accordance with variations in the pressure of a second fluid comprising a relief valve for adjusting the pressure of said first fluid; resilient loading means for the relief valve; a pressure fluid servo system including a cylinder and a piston slidable therein, the piston being separate from the relief valve but directly engaging the resilient loading means, and a piston-type servo valve having a stem mounted with its axis parallel to the cylinder axis for axial sliding movement for controlling the flow of pressure fluid to and from the cylinder to move the piston to adjust the loading of the resilient loading means on the relief valve to any desired value over a range of values; pressure sensitive capsule means coaxial with the servo valve stem and sensitive to the pressure of the second fluid and having one end connected to one end of the servo valve stem to vary the valve setting; a guide rod mounted for axial sliding movement coaxially with the servo valve stem and having one end connected to the other end of the capsule means; a block mounted for movement parallel to the cylinder axis; a fulcrum pivot mounted on said block; a push rod mounted with its axis parallel to the axis of the servo valve stem for axial sliding movement, one end of the rod engaging with the piston; a rocker pivotally connected at one end to the push rod and at the other end to the guide rod and pivotally mounted between its ends on the fulcrum pivot to complete a follow up movement between the piston and the servo valve stem; and manually operated lever means operatively connected to the block to move it and so to move the fulcrum pivot and the servo valve stem to vary the loading of the resilient loading means on the relief valve independently of the setting of the capsule means.

References Cited in the file of this patent

UNITED STATES PATENTS

| | | | |
|---|---|---|---|
| 219,114 | Ross | Sept. 2, | 1879 |
| 251,726 | Mueller | Jan. 3, | 1882 |
| 1,267,281 | Schneider | May 21, | 1918 |
| 1,270,170 | Kingsbury | June 18, | 1918 |
| 1,294,151 | Page | Feb. 11, | 1919 |
| 1,623,431 | McVoy | Apr. 5, | 1927 |
| 1,640,842 | Loomis | Aug. 30, | 1927 |
| 1,716,705 | McEwan | June 11, | 1929 |
| 1,773,268 | Jenkins | Aug. 19, | 1930 |
| 1,995,800 | Dodson | Mar. 26, | 1935 |
| 2,034,222 | Baker | Mar. 17, | 1936 |
| 2,213,412 | Rosskopf | Sept. 3, | 1940 |
| 2,217,364 | Halford | Oct. 8, | 1940 |
| 2,270,365 | Wilson | Jan. 20, | 1942 |
| 2,344,583 | Annin | Mar. 21, | 1944 |
| 2,381,346 | Gregg | Aug. 7, | 1945 |
| 2,408,836 | Warner | Oct. 8, | 1946 |
| 2,669,245 | Walker | Feb. 16, | 1954 |

FOREIGN PATENTS

| | | |
|---|---|---|
| 383,378 | Great Britain | 1932 |
| 515,497 | Great Britain | 1939 |